United States Patent
Beuschel et al.

(10) Patent No.: US 12,276,351 B2
(45) Date of Patent: Apr. 15, 2025

(54) ACTUATOR ASSEMBLY FOR AN ELECTROMAGNETICALLY ACTUATABLE VALVE

(71) Applicant: Conti Temic microelectronic GmbH, Ingolstadt (DE)

(72) Inventors: Michael Beuschel, Stammham (DE); Stefan Bauer, Geisenfeld (DE); Holger Fernengel, Ingolstadt (DE); Jürgen Wedell, Ingolstadt (DE); Alexander Kerler, Titting (DE)

(73) Assignee: Conti Temic microelectronic GmbH, Ingolstadt (DE)

( * ) Notice: Subject to any disclaimer, the term of this patent is extended or adjusted under 35 U.S.C. 154(b) by 22 days.

(21) Appl. No.: 17/914,131

(22) PCT Filed: Feb. 16, 2021

(86) PCT No.: PCT/DE2021/200015
§ 371 (c)(1),
(2) Date: Sep. 23, 2022

(87) PCT Pub. No.: WO2021/190714
PCT Pub. Date: Sep. 30, 2021

(65) Prior Publication Data
US 2023/0121862 A1    Apr. 20, 2023

(30) Foreign Application Priority Data

Mar. 25, 2020    (DE) ..................... 10 2020 203 859.7

(51) Int. Cl.
*F16K 31/06*    (2006.01)
*B60N 2/66*    (2006.01)
(Continued)

(52) U.S. Cl.
CPC .......... *F16K 31/0696* (2013.01); *B60N 2/665* (2015.04); *B60N 2/914* (2018.02);
(Continued)

(58) Field of Classification Search
None
See application file for complete search history.

(56) References Cited

U.S. PATENT DOCUMENTS 2,923,521 A    2/1960    Ray
4,245,815 A    1/1981    Willis
(Continued)

FOREIGN PATENT DOCUMENTS

DE    3635656 A1    4/1988
DE    19754525 C1    4/1999
(Continued)

OTHER PUBLICATIONS

Office Action dated Dec. 1, 2020 from corresponding German patent application No. 10 2020 203 859.7.
(Continued)

*Primary Examiner* — Matthew W Jellett (57) ABSTRACT

An actuator arrangement (10) for an electromagnetically actuatable valve (42, 66, 72) is disclosed. The actuator arrangement (10) comprises: a housing having a first housing wall (12) and having a second housing wall (14) situated opposite the first housing wall (12), a solenoid armature (16) which is arranged in the housing between the first housing wall (12) and the second housing wall (14) and which is movable between the first housing wall (12) and the second housing wall (14) along an axis (18), wherein the solenoid armature (16) has a first axial armature end surface (20), which faces toward the first housing wall (12), and a second axial armature end surface (22), which faces toward the
(Continued)

second housing wall (14), and the solenoid armature (16) is movable between a first position, in which the first armature end surface (20) makes contact with the first housing wall (12), and a second position, in which the first armature end surface (20) has been moved away from the first housing wall (12). The actuator arrangement (10) furthermore comprises a damping element (24, 24A, 24B) which is arranged on the second armature end surface (22) and which extends from the second armature end surface (22) in the direction of the second housing wall (14) and which is composed of an elastomer material, wherein the at least one damping element (24, 24A, 24B) makes contact with the second housing wall (14) both in the first position and in the second position of the solenoid armature (16), and at least one stop element (26, 30, 30A, 30B) which is arranged on the second armature end surface (22) and which extends from the second armature end surface (22) in the direction of the second housing wall (14) and which is composed of an elastomer material and which, in the first position of the solenoid armature (16), has been moved away from the second housing (14) and, in the second position of the solenoid armature (16), makes contact with the second housing wall (14).

15 Claims, 6 Drawing Sheets (51) Int. Cl.
*B60N 2/90* (2018.01)
*H01F 7/08* (2006.01)
*H01F 7/16* (2006.01)

(52) U.S. Cl.
CPC ......... *F16K 31/0679* (2013.01); *H01F 7/088* (2013.01); *H01F 7/1607* (2013.01)

(56) References Cited

U.S. PATENT DOCUMENTS

| | | | |
|---|---|---|---|
| 4,523,739 A * | 6/1985 | Johansen | ............ F16K 31/0696 251/129.21 |
| 6,019,344 A | 2/2000 | Engel et al. | |
| 6,560,088 B1 | 5/2003 | Beck et al. | |
| 6,837,478 B1 | 1/2005 | Goossens et al. | |
| 9,982,797 B2 * | 5/2018 | Ye | ........ F16K 31/0696 |
| 10,041,605 B2 * | 8/2018 | Kang | ..................... B60N 2/914 |
| 10,473,228 B2 * | 11/2019 | Hutchins | ................ B60T 8/362 |
| 2016/0339891 A1 | 11/2016 | Arumugham et al. | |

FOREIGN PATENT DOCUMENTS

| | | | |
|---|---|---|---|
| DE | 19860272 B4 | 7/2000 | |
| DE | 202004012046 U1 | 12/2005 | |
| DE | 102011087964 A1 * | 6/2013 | ......... F02M 25/0836 |
| DE | 202014006875 U1 | 12/2014 | |
| DE | 102016211852 A1 | 1/2018 | |
| EP | 0555177 A1 | 8/1993 | |
| GB | 2494274 A | 3/2013 | |
| SE | 540750 C2 | 3/2017 | |

OTHER PUBLICATIONS

International Search Report and Written Opinion dated Jun. 14, 2021 from corresponding International patent application No. PCT/DE2020/200015.
Office Action dated Jan. 29, 2025 from corresponding German patent application No. 10 2020 203 859.7.

* cited by examiner

ACTUATOR ASSEMBLY FOR AN ELECTROMAGNETICALLY ACTUATABLE VALVE

The present invention relates to an actuator arrangement for an electromagnetically actuatable valve. The actuator arrangement may be used in particular for a pneumatic adjusting device of a vehicle seat.

In modern vehicle seats, fluid chambers or fluid bladders which can be filled with a pressure medium, in particular with a gaseous pressure medium such as compressed air, are situated as control elements in the region of the seat face or backrest (together also referred to as seat contact face). Such fluid chambers can be supplied with the pressure medium via a respective pressure medium line. The volume of said fluid chambers is increased by filling a respective fluid chamber with pressure medium, or decreased by emptying said fluid chamber, respectively, such that the properties of the seat contact face, in particular the contour of the latter, can be varied. For the filling of the respective fluid chamber with pressure medium, the pressure medium is firstly generated by a pressure medium source, for example by a compressor or a compressor unit, and guided via a suitable valve to a respective fluid chamber in controlled fashion.

Electromagnetic valves are commonly used for this purpose, which are actuated by an actuator arrangement. A disadvantage of such actuator arrangements is however the relatively loud switching noise. This is because, as soon as the solenoid armature is set in motion when sufficiently electrically energized, the air gap between the solenoid armature and the electromagnetic core decreases. The magnetic force thus increases overproportionately with the travel covered by the solenoid armature. In the case of an only linear increase of a restoring-spring-imparted spring force that counteracts the movement of the solenoid armature, this leads to a high speed of the solenoid armature, which is abruptly braked only when the solenoid armature strikes the oppositely situated stop (for example an electromagnetic core). The consequence is a loud "click" of the valve.

It is therefore an object of the present invention to provide an actuator arrangement for an electromagnetically actuatable valve, which is distinguished by reduced generation of noise or by a reduced switching noise.

This object is achieved by means of an actuator arrangement according to patent claim 1. Advantageous refinements are the subject matter of the dependent claims.

The actuator arrangement according to the invention comprises a housing having a first housing wall and having a second housing wall situated opposite the first housing wall, and a solenoid armature which is arranged in the housing between the first housing wall and the second housing wall. Here, the solenoid armature is movable between the first housing wall and the second housing wall along an axis. Preferably, the solenoid armature is a cylindrical, in particular circular cylindrical, solenoid actuator, and comprises a first axial end surface, which faces toward the first housing wall, and a second axial end surface, which is situated opposite the first axial end surface and which faces toward the second housing wall. The term "axial armature end surface" means that the armature end surfaces of the solenoid armature run perpendicular to the axis along which the solenoid actuator is movable. The solenoid armature is movable between a first position, in which the first armature end surface makes contact with the first housing wall, and a second position, in which the first armature end surface has been moved away from the first housing wall.

The actuator arrangement according to the invention furthermore comprises at least one damping element which is arranged on the second armature end surface and which extends from the second armature end surface in the direction of the second housing wall and which is composed of an elastomer material, wherein the at least one damping element makes contact with the second housing wall both in the first position and in the second position of the solenoid armature, and at least one stop element which is arranged on the second armature end surface and which extends from the second armature end surface in the direction of the second housing wall (and which differs from the at least one damping element) and which is composed of an elastomer material and which, in the first position of the solenoid armature, has been moved away from the second housing and, in the second position of the solenoid armature, makes contact with the second housing wall.

By virtue of the fact that the at least one damping element is in contact with the second housing wall both in the first position and in the second position of the solenoid armature, no free-flight phase of the solenoid armature occurs during movement from the first position into the second position. Rather, the solenoid armature is continuously in contact with the second housing wall via the at least one damping element, whereby a generation of noise by the actuator arrangement is noticeably reduced. It is furthermore the case that the at least one damping element is formed from an elastomer material, such that the at least one damping element is compressed during the movement of the solenoid armature from the first position into the second position. The compression leads to a damped movement of the solenoid armature from the first position into the second position, whereby a generation of noise is further reduced. The elastomer material is in particular selected such that a progressive spring characteristic, which dampens the movement of the solenoid armature (and which in particular absorbs energy), is achieved. As elastomer material, use may for example be made of elastomer EPDM or silicone. It is furthermore also the case that the at least one stop element, which makes contact with the second housing wall only in the second position of the solenoid armature, is likewise formed from an elastomer material. The at least one stop element serves as a stop for the movement of the solenoid armature from the first position into the second position, and is likewise compressed when it strikes the second housing wall. All of this contributes to a situation in which the actuator arrangement has a relatively low switching noise, and thus, in particular in pneumatic adjusting devices of vehicle seats, in which the actuator arrangement is generally arranged very close to the vehicle occupant, does not contribute to an unnecessary generation of noise.

It is particularly advantageous if the at least one damping element and the at least one stop element are formed from the same elastomer material. It is thus possible to achieve inexpensive production of the actuator arrangement, in particular because both the at least one damping element and the at least one stop element can be applied to the second armature end surface in one common working step using the same elastomer material. This may for example be performed by virtue of both elements being injection-molded onto the second armature end surface.

In a further preferred refinement, in the first position of the solenoid armature, an axial extent of the at least one damping element is greater than an axial extent of the at least one stop element. In other words, in the first position of the solenoid armature, the at least one damping element projects further than the at least one stop element in the direction of the second housing wall. Here, the at least one stop element may be of virtually planar form on the second armature end surface, such that the at least one stop element virtually does not project from the second armature end surface. Preferably, however, the at least one stop element will also project in the direction of the second housing wall or protrude from the second armature end surface in the direction of the second housing wall. By virtue of the fact that the at least one damping element projects further than the at least one stop element in the direction of the second housing wall, it is not necessary for the second housing wall to be provided with projections that are specially configured for the damping element and the stop element.

It is particularly advantageous if, furthermore, a difference (in terms of magnitude) between the axial extent of the at least one stop element and the axial extent of the at least one damping element is substantially in the range of a stroke of the solenoid armature. The stroke of the solenoid armature describes the actuating travel covered by the solenoid armature during its movement from the first to the second position. It is ensured by means of this refinement that, on the one hand, the damping element already bears against the second housing wall in the first position and, furthermore, virtually no compression acts on the damping element in the first position of the solenoid armature. In this way, unnecessary pre-compression of the at least one damping element in the first position of the solenoid armature is reduced, whereby the material wear of the at least one damping element is reduced, and the service life or durability of the at least one damping element is increased.

According to a further preferred refinement, the second housing wall has a fluid opening which extends through the second housing wall, and the at least one stop element, in the second position of the solenoid armature, makes fluid-tight contact with a sealing seat of the fluid opening. In this preferred refinement, the stop element thus performs a dual function. It serves not only as a stop in the second position of the solenoid armature but also as a sealing element for the fluid-tight closure of the fluid opening. This is advantageous in particular if the fluid opening is for example a nozzle seat for a fluid source or for a fluid connection to the surroundings, because in such a situation, the stop element can act as a sealing element that is formed integrally on the second armature end surface.

In another advantageous refinement, the second housing wall has a fluid opening which extends through the second housing wall, and the at least one damping element is arranged spaced apart from the at least one stop element such that, both in the first position of the solenoid armature and in the second position of the solenoid armature, a fluid channel for a fluid flowing radially at the second armature end surface and through the fluid opening is formed between the at least one damping element and the at least one stop element. In this refinement, it is thus ensured that, even in the event of contact of the stop element and damping element in the second position of the solenoid armature, there is still a sufficiently large free space between the damping element and the stop element such that a sufficiently large fluid channel for a fluid flowing radially at the second armature end surface and through the fluid opening is provided between the damping element and the stop element. This refinement can for example be used to particular advantage if it is intended to use the fluid opening through the second housing wall exclusively as a fluid connection that cannot be completely closed.

In a further preferred refinement, the at least one damping element has an axial damping element end surface, and a size of the axial damping element end surface lies in a range from approximately 5% to approximately 50%, in particular in a range from approximately 10% to approximately 20%, of a size of the second armature end surface. By means of this refinement, a particularly soft force-travel characteristic during the compression of the at least one damping element is achieved, which furthermore also contributes to an in particular energy-absorbing, progressive spring characteristic.

In a further preferred refinement, in the first position of the solenoid armature, an extent of the at least one stop element in a circumferential direction of the solenoid armature is at least twice as great as an extent of the at least one damping element in the circumferential direction of the solenoid armature. In other words, as viewed in a circumferential direction of the solenoid armature, the at least one stop element is wider than the at least one damping element. By means of this refinement, it is achieved that the stop element has a force-travel characteristic that is hard in relation to the damping element. This has the effect that the maximum stroke of the solenoid armature can be precisely set, for high repeat accuracy of the response behavior of the actuator arrangement.

According to a further preferred refinement, the at least one damping element has a first extent dimension in an axial direction of the solenoid armature, has a second extent dimension in a circumferential direction of solenoid armature, and has a third extent dimension in a radial direction of the solenoid armature, wherein a ratio of the first extent dimension (axial direction) to the second extent dimension (circumferential direction) lies in a range between approximately 1 and approximately 2, and a ratio of the first extent dimension (axial direction) to the third extent dimension (radial direction) lies in a range between approximately 1 and approximately 2. In other words, the at least one damping element is preferably equally as tall as it is wide (in a circumferential direction and/or radial direction) but at most twice as tall as it is wide (in a circumferential direction and/or radial direction). By means of this ratio of these three extent dimensions with respect to one another, it is ensured that the at least one damping element has a sufficiently great extent in an axial direction, so as not to have too hard a force-travel characteristic, but at the same time does not have too great an extent in an axial direction, so as not to be buckled rather than compressed during the movement of the solenoid armature from the first position into the second position.

In a further preferred refinement, the actuator arrangement furthermore has at least one further damping element which is arranged on the second armature end surface and which extends from the second armature end surface in the direction of the second housing wall and which makes contact with the second housing wall both in the first position and in the second position of the solenoid armature, wherein the at least one further damping element is arranged spaced apart from the at least one damping element such that, at least in the first position of the solenoid armature, a fluid channel for a fluid flowing radially at the second armature end surface is formed between the at least one damping element and the at least one further damping element. It is thus also insured in the case of an additional damping element that, at least in the first position, a sufficiently large fluid channel for a fluid flowing radially at the second armature end surface is formed.

In a particularly preferred refinement, the at least one further damping element has the same extent dimensions in a radial, an axial and a circumferential direction as the at least one damping element. It is particularly preferable if the at least one damping element and the at least one further damping element furthermore have an equal radial spacing from or to the axis along which the solenoid armature is movable, in particular if the axis constitutes, for example, a central axis of a cylindrical, in particular circular cylindrical, solenoid armature.

If, in addition to the at least one damping element, the actuator arrangement furthermore has at least one further damping element, a size of the damping element end surface formed collectively by the at least one damping element and by the at least one further damping element should in turn lie in a range between approximately 5% and approximately 50%, in particular in a range between approximately 10% and approximately 20%, of the size of the second armature end surface in order to ensure the soft force-travel characteristic of the damping elements as already discussed above.

In a further preferred refinement, the second housing wall is configured at least partially as an electromagnetic core. In this refinement, the solenoid armature would thus be pulled toward the electromagnetic core, which serves as a stop for the solenoid armature, into the second position. It is particularly advantageous if the fluid opening of the second housing wall is furthermore formed in the electromagnetic core. It would thus for example be possible for the nozzle seat for the fluidic connection to ambient pressure, for example, to be formed directly in the electromagnetic core.

In a further refinement, it is alternatively or additionally possible for the first housing wall to have a fluid opening that extends through the housing wall, and for the actuator arrangement to furthermore have a sealing element which is arranged on the first armature end surface and which extends from the first armature end surface in the direction of the first housing wall and which, in the first position of the solenoid armature, makes fluid-tight contact with a sealing seat, arranged at the first housing wall, of the fluid opening. If both the first housing wall and the second housing wall each have a fluid opening, then it would for example be possible to fill a fluid chamber or fluid bladder in controlled fashion with a fluid situated in a fluid source, or to ventilate the fluid chamber or fluid bladder that has been filled with the fluid.

It is particularly advantageous if both the at least one damping element and the at least one stop element and also the sealing element are formed from the same elastomer material, because this in turn allows inexpensive and time-saving production of the actuator arrangement.

Finally, in a further preferred refinement, the actuator arrangement furthermore has a restoring element which is configured to preload the solenoid armature into the first position in the absence of actuation, that is to say in the case of electromagnetic deactivation. In this way, it is for example possible for an NO valve (normally open valve) or an NC valve (normally closed valve) to be created.

Further features and objects of the present invention will become apparent to a person skilled in the art by practicing the present teaching and taking into consideration the accompanying drawings. In the drawings.

Elements of identical design or function are provided with the same reference designations across all figures.

Figure 1:
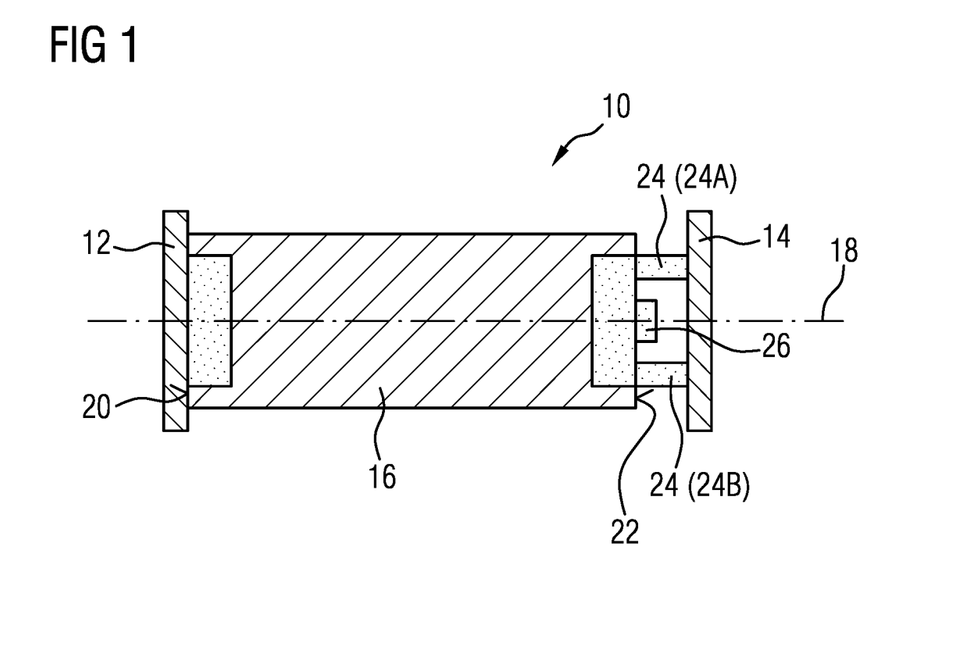
FIG. 1 shows a schematic view of an embodiment of an actuator arrangement according to the invention having a solenoid armature, which is shown in a first position.

Reference is made firstly to FIG. 1, which shows a schematic view of an actuator arrangement 10 according to the invention in simplified form. The actuator arrangement 10 has a housing having a first housing wall 12 and having a second housing wall 14 situated opposite the first housing wall 12. A solenoid armature 16 is arranged within the housing between the first housing wall 12 and the second housing wall 14. In the specific example of FIG. 1, the solenoid armature 16 is illustrated as a cylindrical armature, in particular circular cylindrical armature, though may also have other refinements in other embodiments that are not illustrated.

The solenoid armature 16 is, between the first housing wall 12 and the second housing wall 14, movable axially along an axis 18 between a first position and a second position. FIG. 1 shows the solenoid armature 16 in a first position, and FIG. 2 shows the solenoid armature 16 in a second position.

The solenoid armature 16 has a first axial armature end surface 20, which is substantially perpendicular to the axis 18, and a second axial armature end surface 22, which is situated opposite the first axial armature end surface 20 and which is substantially likewise perpendicular to the axis 18. The first axial armature end surface 20 faces toward the first housing wall 12, and the second axial armature end surface 22 faces toward the second housing wall 14.

As shown in FIG. 1, in the first position of the solenoid armature 16, the first armature end surface 20 makes contact with the first housing wall 12. As shown in FIG. 2, in the second position of the solenoid armature 16, the first armature end surface 20 has been moved away from the first housing wall 12.

Figure 2:
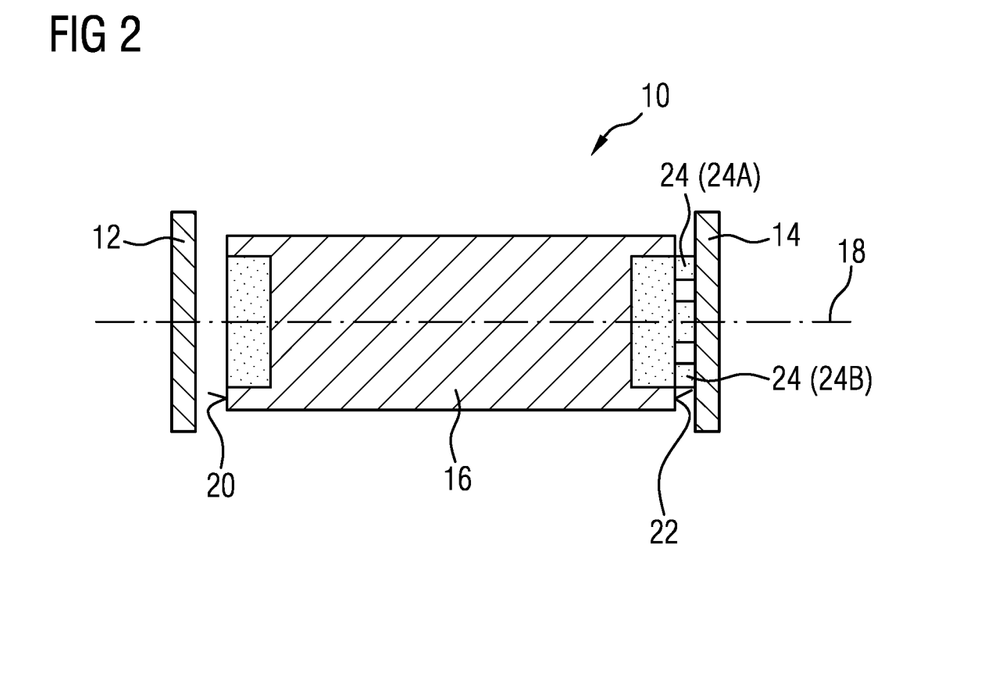
FIG. 2 shows a schematic view of an embodiment of an actuator arrangement according to the invention, wherein the solenoid actuator is shown in a second position.

As is also shown in FIGS. 1 and 2, the second armature end surface 22, that is to say that armature end surface which faces toward the second housing wall 14, has a damping element 24 which is arranged on the second armature end surface 22 and which extends from the latter in the direction of the second housing wall 14. In the specific example of FIGS. 1 and 2, the damping element 24 has a first damping element 24A and a second damping element 24B, though may also have more or fewer damping elements in other embodiments that are not shown. Aside from the damping elements 24A and 24B, the second axial end surface 22 furthermore has a stop element 26. Both the damping elements 24A, 24B and the stop element 26 are produced from an elastomer material such as EPDM or silicone, and may for example be injection-molded onto the second armature end surface 22.

As shown by a comparison of FIG. 1 with FIG. 2, the damping elements 24A, 24B make contact with the second housing wall 14 both in the first position and in the second position of the solenoid armature 16. By contrast, the stop element 26 makes contact with the second housing wall 40 only in the second position of the solenoid armature 16 (see FIG. 2). There is thus no free-flight phase for the solenoid armature 16 during a movement of the solenoid armature 16 from the first position into the second position. Instead, during the movement of the solenoid armature 16 from the first position into the second position, the elastomer damping elements 24A, 24B are compressed, whereby the movement of the solenoid armature 16 is dampened, in particular in energy-absorbing fashion. The use of the elastomer material furthermore leads to a progressive spring characteristic, that is to say the spring characteristic of the damping elements 24A, 24B increases similarly to or to a greater degree than the magnetic force over the movement travel of the armature, and thus prevents a high speed of the solenoid armature 16 during the switching process. It is advantageous in this context if the magnetic field for the actuation of the actuator arrangement 10 is built up in ramped fashion over time upon the activation of the electrical energization and is likewise depleted in ramped fashion over time upon the deactivation of the electrical energization. There is thus at all times force equilibrium between the progressive spring characteristic of the damping elements 24, 24B, and of a restoring element that may be used, on the one hand, and the magnetic force on the other hand. Together with the absence of a free-flight phase of the solenoid armature 16, this leads to a low movement speed of the solenoid armature 16 and thus to an altogether very low generation of noise during the movement of the solenoid armature 16 from the first position into the second position and during the movement of the solenoid armature 16 from the second position into the first position.

Figure 3:
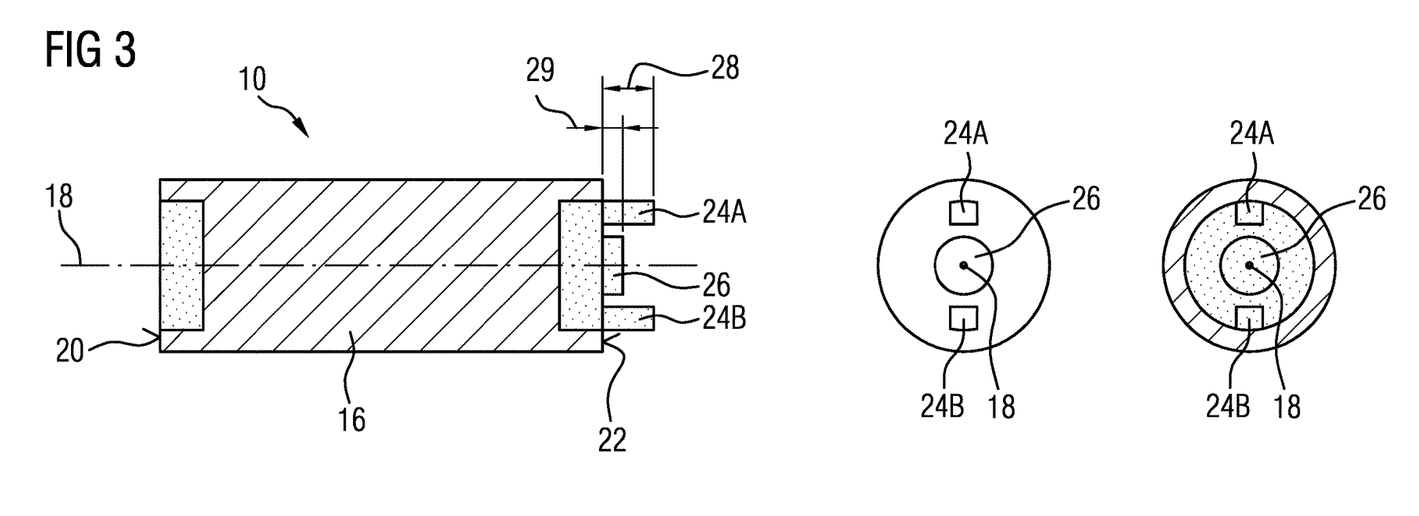
FIG. 3 shows a schematic detail view of an embodiment of an actuator arrangement according to the invention in a side view, a plan view and a sectional view.

Reference is now made to FIG. 3, which shows a schematic detail view of the actuator arrangement 10 in a side view, a plan view and a sectional view.

In this specific example, too, the solenoid armature 16 is illustrated as a circular cylindrical armature. In other embodiments that are not shown, the solenoid armature 16 may self-evidently have other embodiments.

As can be seen in FIG. 3, the damping elements 24A, 24B have an axial extent 28 in the direction of the axis 18. This axial extent 28 is greater than an axial extent 29 of the stop element 26. In other words, at least in the first position of the solenoid armature 16, the damping elements 24A, 24B project further than the stop element 26 in the direction of the second housing wall 14. A difference between the axial extent 28 of the damping elements 24A, 24B and the axial extent 29 of the stop element 26 is in this case such that the difference in the axial extents 28, 29 lies substantially in the range of a stroke of the solenoid armature 16, wherein the stroke of the solenoid armature 16 describes the actuating travel covered by the latter during the movement from the first position to the second position. This is achieved in that, firstly, a free-flight phase of the solenoid armature 16 is avoided, and secondly, there is also no unnecessary precompression of the damping elements 24A, 24B in the first position of the solenoid armature 16.

As can also be seen in FIG. 3, the stop element 26 in the refinement shown in FIG. 3 is furthermore configured as a circular disk, that is to say the stop element 26 extends through 360° in a circumferential direction of the axis 18. In such a refinement, the stop element 26 can, in the second position of the solenoid armature 16, serve as a sealing element for sealing a fluid opening that is present in the second housing wall 14, as will be described in more detail for example in conjunction with FIGS. 6 and 7.

Figure 4:
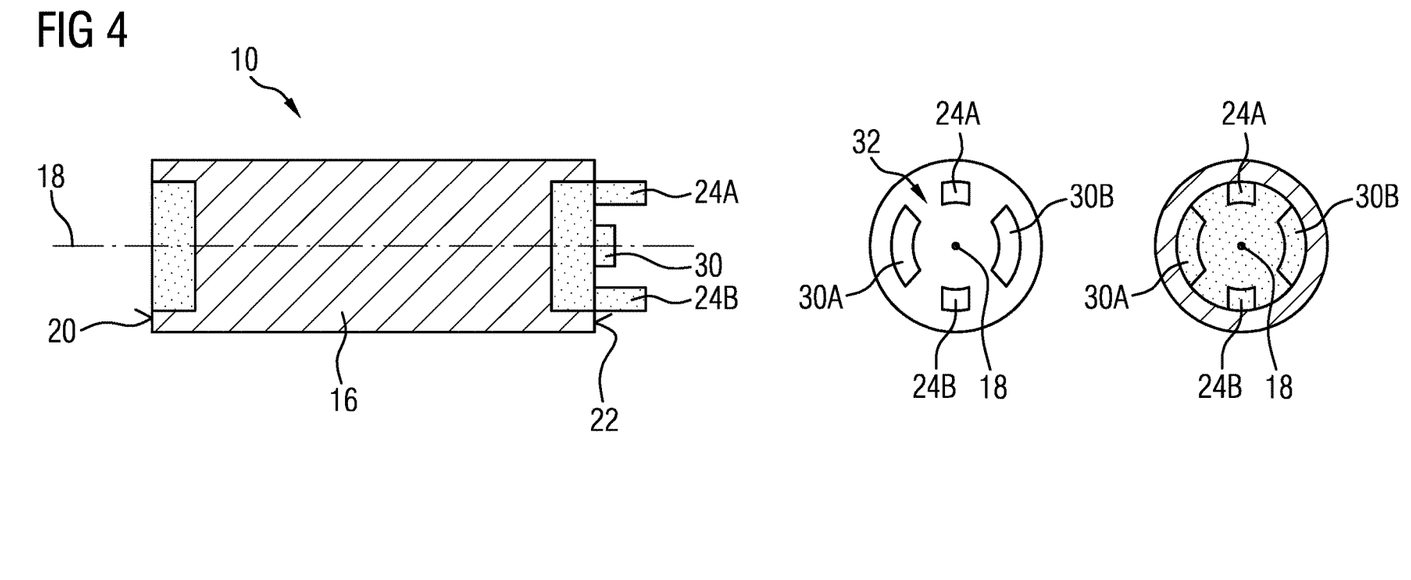
FIG. 4 shows a schematic detail view of a further embodiment of an actuator arrangement according to the invention in a side view, a plan view and a sectional view.

Reference will now be made to FIG. 4, which shows a further embodiment of the actuator arrangement 10. By contrast to FIG. 3, the stop element 30 in FIG. 4 is configured not as a circular disk extending through 360° in a circumferential direction but as two stop elements 30A and 30B, which in the specific example of FIG. 4 are situated substantially opposite one another. The stop elements 30A, 30B furthermore extend only over a relatively small angle range in a circumferential direction of the axis 18, such that a fluid channel 32 is formed between the stop elements 30A, 30B and the damping elements 24A, 24B. The damping element 24A and the further damping element 24B are also arranged spaced apart from one another (and from the stop elements 30A, 30B) such that fluid channels 32 are present both in the first position and in the second position of the solenoid armature 16. By virtue of the elements 24A, 24B, 30A, 30B being configured and arranged to be spaced apart among themselves and from one another such that flow channels 32 are formed, a flow of fluid over the second armature end surface 22 is made possible. The elements 24A, 24B, 30A, 30B may furthermore be configured and arranged to be spaced apart among themselves and from one another such that the flow of fluid over the second armature end surface 22 is ensured both in the first position and in the second position of the solenoid armature 16, as will be discussed in more detail for example in conjunction with FIGS. 8 and 9.

Figure 5:
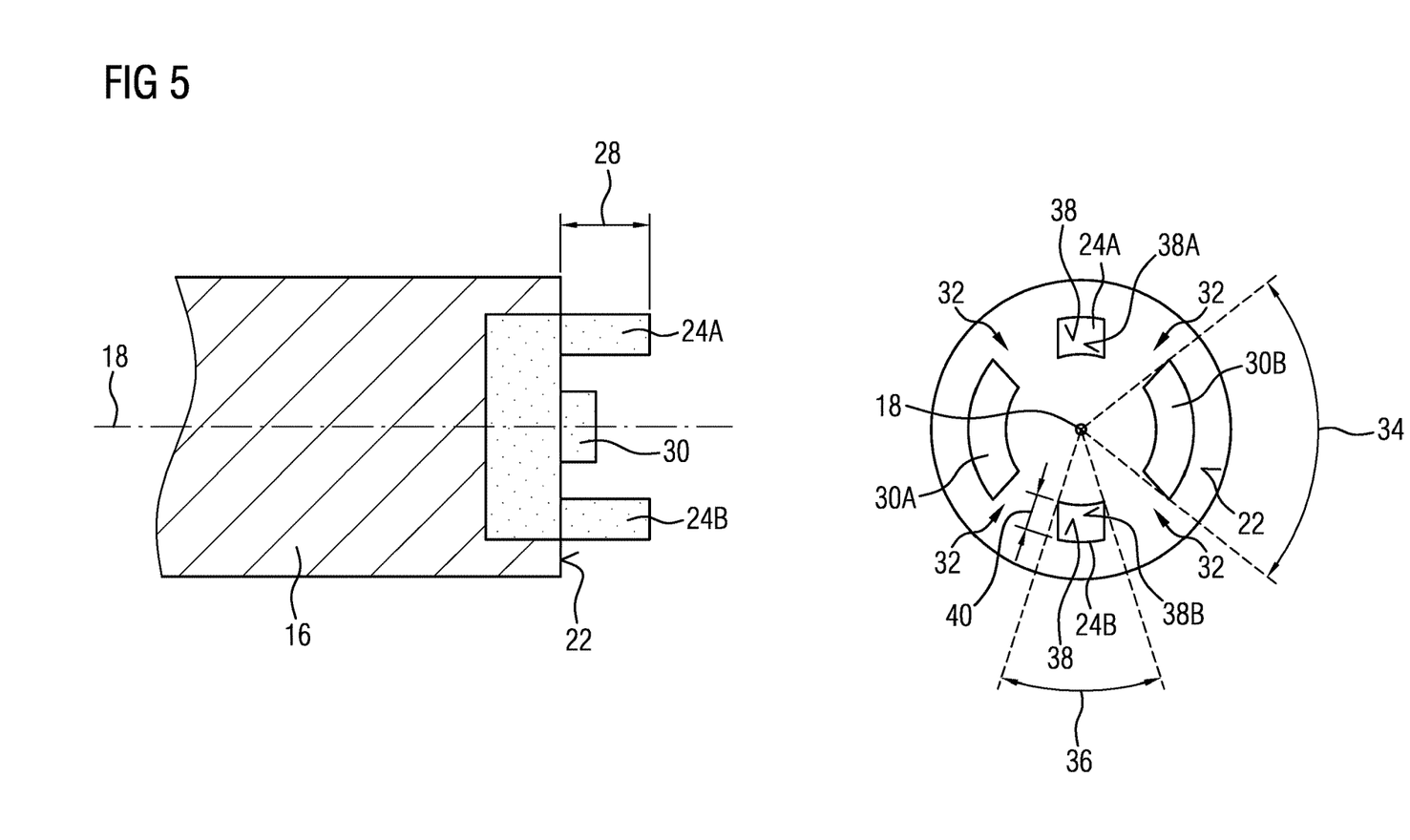
FIG. 5 shows an enlarged schematic detail view of the actuator arrangement from FIG. 4 in a side view and a plan view.

Reference is now made to FIG. 5, which shows an enlarged schematic detail view of the actuator arrangement 10 from FIG. 4 in a side view and a plan view, wherein the solenoid armature 16 is shown in the first position in FIG. 5.

As is shown in FIG. 5, in the first position of the solenoid armature 16, an extent 34 of the stop element 30A, 30B in a circumferential direction of the axis 18 is more than twice as great as an extent 36 of the damping element 24A or 24B in the circumferential direction of the axis 18. In other words, the stop elements 30A, 30B are more than twice as wide as the damping elements 24A, 24B. By virtue of the fact that the stop elements 30A, 30B are more than twice as wide as the damping elements 24A, 24B, the stop elements 30A, 30B have, in relation to the damping elements 24A, 24B, a harder force-travel characteristic in relation to the relatively narrow damping elements 24A, 24B.

Furthermore, a collective axial damping element end surface 38 of the damping elements 24A, 24B, which corresponds to the sum of the axial damping element end surfaces 38A, 38B of the respective damping elements 24A, 24B, is in a range between approximately 5% and approximately 50%, in particular in a range between approximately 10% and approximately 20%, of the size of the second armature end surface 22. Here, the axial damping element end surface 38 occupies a relatively small proportion of the second armature end surface 22, as a result of which a particularly soft force-travel characteristic for the damping elements 24A, 24B is achieved.

Furthermore, the damping elements 24A, 24B have a first extent or a first extent dimension 28 in an axial direction of the solenoid armature 16, a second extent or a second extent dimension 36 in a circumferential direction of the solenoid armature 16, and a third extent or a third extent dimension 40 in a radial direction of the solenoid armature 16. A ratio of the first extent dimension 28 to the second extent dimension 36 is in this case selected such that this ratio is in a range between approximately 1 and 2. Furthermore, a ratio of the first extent dimension 28 to the third extent dimension 40 is in this case selected such that this ratio is in a range between approximately 1 and approximately 2. In other words, this means: The damping elements 24A, 24B each have a shape that is approximately equally as tall as it is wide (as viewed in a circumferential direction and/or radial direction) but at most twice as tall as it is wide (as viewed in a circumferential direction and/or radial direction). Such a shape ensures that the damping elements 24A, 24B have a sufficient height, so as not to have too hard a force-travel characteristic, but at the same time are not too tall, so as not to be buckled during the movement of the solenoid armature 16 from the first position into the second position. It is not essential to the invention for the extent dimensions of the damping elements 24A, 24B in a circumferential direction and a radial direction to be equal.

Figure 6:
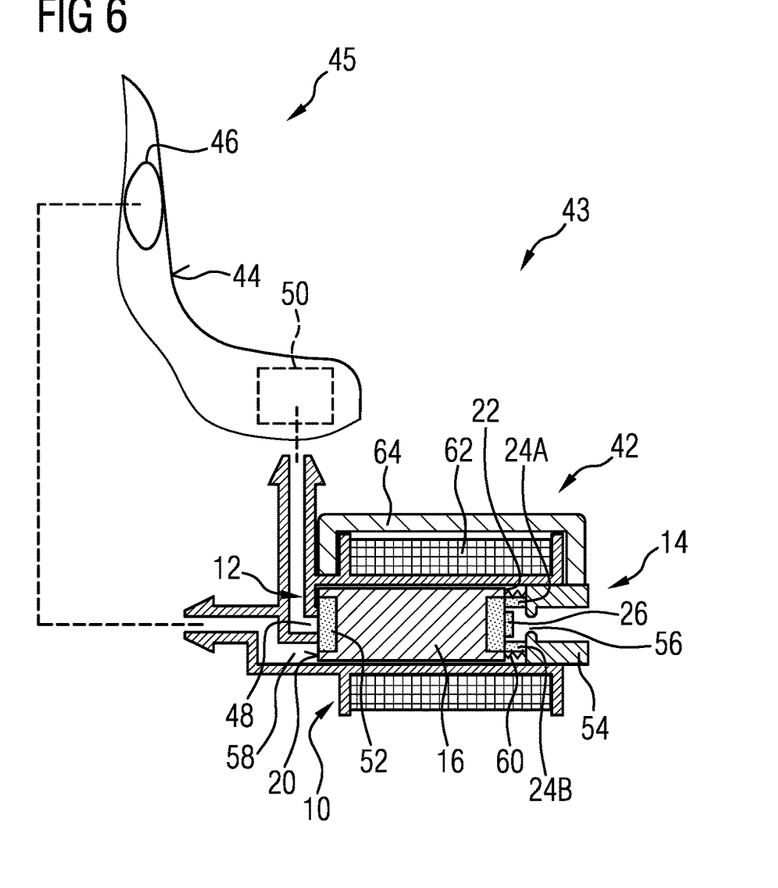
FIG. 6 shows a schematic view of an embodiment of an actuator arrangement according to the invention in a 3/2 NO valve for a pneumatic adjusting device of a vehicle seat, wherein a ventilation state is shown.
Figure 7:
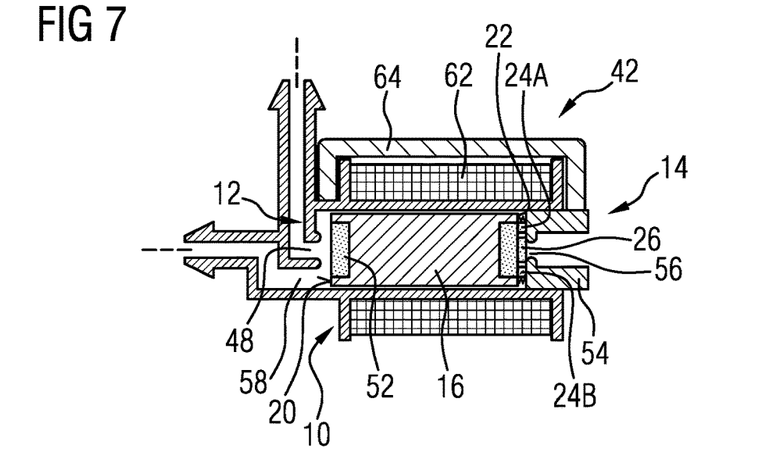
FIG. 7 shows a schematic view of the actuator arrangement from FIG. 6, wherein a filling state is shown.

Reference is now made to FIGS. 6 and 7, which show a schematic view of the actuator arrangement 10 in an electromagnetically actuatable 3/2 NO valve 42. The term "3/2 NO valve" means that this valve has three ports and two positions and is open (NO=normally open) in an inactive (electrically deenergized) state.

In the specific example of FIGS. 6 and 7, the 3/2 NO valve 42 is part of a pneumatic adjusting device 43. This pneumatic adjusting device 43 is used to adjust a seat contact face 44 of a vehicle seat 45 by means of a fluid-fillable fluid bladder or fluid chamber 46, by virtue of the fluid bladder 46 being filled or emptied. FIG. 6 shows the 3/2 NO valve 42 in an electrically deenergized state, in which the fluid bladder 46 is being ventilated or emptied. FIG. 7 shows the 3/2 NO valve 42 in an inactive state, in which the fluid bladder 46 is being filled.

Reference is now made to FIG. 6, in which the 3/2 NO valve 42 is shown in an electrically deenergized state. In this electrically deenergized state, the solenoid armature 16 is situated in the first position, in which the first armature end surface 20 makes contact with the first housing wall 12. In the specific example of FIG. 6, the first housing wall 12 is configured so as to have a fluid opening 48 which extends through the first housing wall 12 and which is fluidically connected via a corresponding fluid connection to a fluid source 50 of the pneumatic adjusting device 43. In the first position of the solenoid armature 16, the fluid opening 48 situated in the first housing wall 12 is furthermore closed in fluid-tight fashion by means of a sealing element 52 which is provided at the first armature end surface 20 and which is configured specifically for this purpose. For this purpose, the sealing element 52 is arranged on the first armature end surface 20 and extends in the direction of the first housing wall 12, such that the solenoid armature 16, in its first position, can make fluid-tight contact with a sealing seat of the fluid opening 48 by means of the sealing element 52 and thus fluidically close the fluid opening 48. In other words, in the first position of the solenoid armature 16, an inflow of fluid from the fluid opening 48 into a valve chamber of the valve 42 is prevented.

The above-discussed damping elements 24A and 24B, and the stop element 26, are situated on the second armature end surface 22, which is situated opposite the first armature end surface 20. In the refinement of FIG. 6 and FIG. 7, the stop element 26 is configured as a circular disk which extends through 360° in a circumferential direction of the solenoid armature 16, as has also been described in more detail in conjunction with FIG. 3. Furthermore, the second housing wall 14 is configured as a magnetic armature 54 and additionally has a fluid opening 56 which extends in the second housing wall 14 or the magnetic armature 54 and which is fluidically connected to the surroundings of the valve 42.

As can also be seen in FIG. 6, the first housing wall 12 furthermore has a non-controllable fluid opening 58 that is fluidically connected via a corresponding fluid connection to the fluid bladder 46. The non-controllable fluid opening 58 constitutes a non-controllable fluidic connection to the valve chamber of the valve 42. Since the damping elements 24A and 24B furthermore make up only a small proportion of the total size of the second armature end surface 22, it is possible for a fluid that flows from the fluid bladder 46 through the non-controllable fluid opening 48 to flow into the valve chamber of the valve 42 and, from there, radially over the second armature end surface 22 and through the fluid opening 56 into the surroundings of the valve 42. In other words, in the first position of the solenoid armature 16, the fluid bladder 46 can be emptied or ventilated by means of the fluid opening 56.

As already discussed, the solenoid armature 16 is situated in the first position in the electrically deenergized state of the valve 42. For this purpose, the solenoid armature 16 is preloaded into the first position by means of a restoring element 60 configured specifically for this purpose.

Now, in addition to the solenoid armature 16 and the electromagnetic core 54, which belong to the actuator arrangement 10, the valve 42 furthermore comprises a magnetic coil 62 and a yoke 64. If the valve 42 is now electrically energized, the solenoid armature 16 moves, in a manner known to a person skilled in the art, from the first position shown in FIG. 6 in the direction of the electromagnetic core 54, until the solenoid armature 16 is finally situated in the second position shown in FIG. 7.

In the second position of the solenoid armature 16, the second armature end surface 20, and in particular the sealing element 52, have been moved away from the first housing wall 12. At the same time, on the second armature end surface 22, not only the two damping elements 24A and 24B but also the stop element 26, configured as a circular disk, are in contact with the second housing wall 14. Since the stop element 26 is configured as a sealing element, it is possible in the second position of the solenoid armature 16 for the stop element 26 to make fluid-tight contact with a sealing seat of the fluid opening 56 and to thus prevent a flow of fluid through the fluid opening 56.

At the same time, however, in the second position of the solenoid armature 16, the fluid opening 48 of the first housing wall 12 is open, such that a fluid situated in the fluid source 50 can flow via the corresponding fluid connection, the fluid opening 48 and the non-controllable fluid opening 58 into the fluid bladder 46. In other words, in the second position of the solenoid armature 16, the fluid bladder 46 can be filled with fluid.

The refinement of the actuator 10 in the 3/2 NO valve 42, as shown in FIGS. 6 and 7, thus allows filling and emptying of the fluid bladder 46, wherein, by means of the specific refinement of the actuator arrangement 10, a reduced switching noise is achieved during the movement of the solenoid armature 16 from the first position into the second position and during the movement of the solenoid armature 16 from the second position into the first position.

Figure 8:
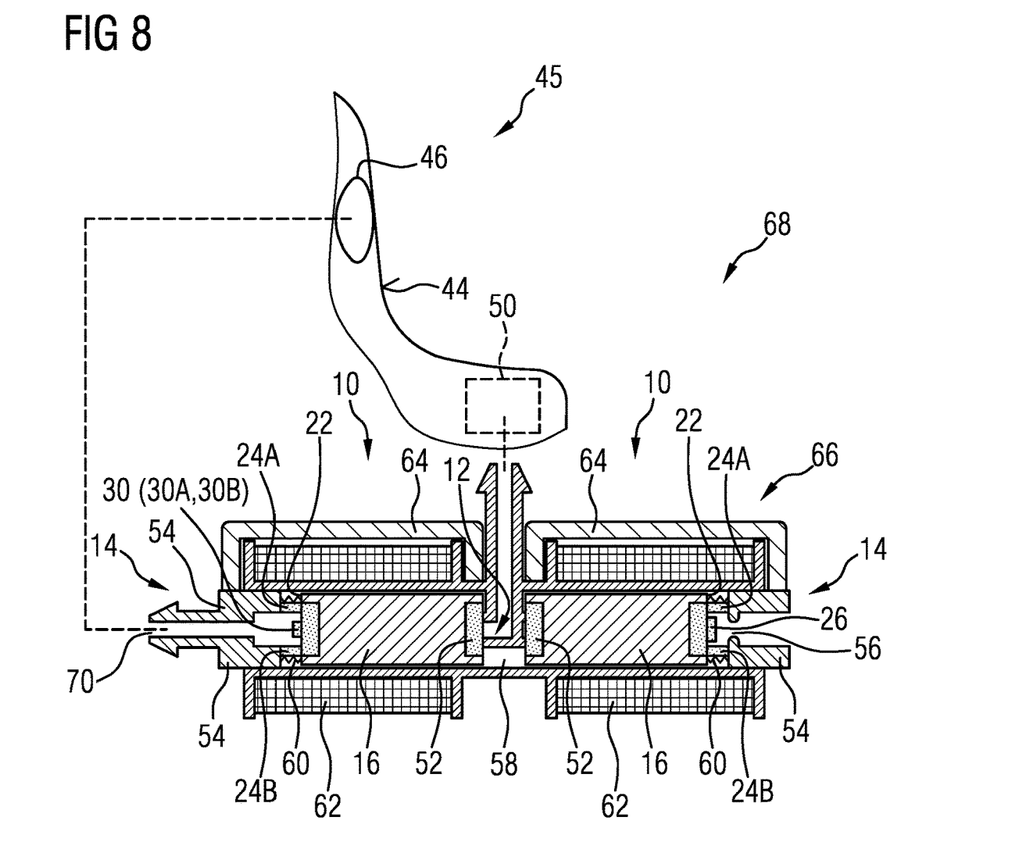
FIG. 8 shows a schematic view of an embodiment of an actuator arrangement according to the invention in a 3/3 NO valve for a pneumatic adjusting device of a vehicle seat, wherein a ventilation state is shown.
Figure 9:
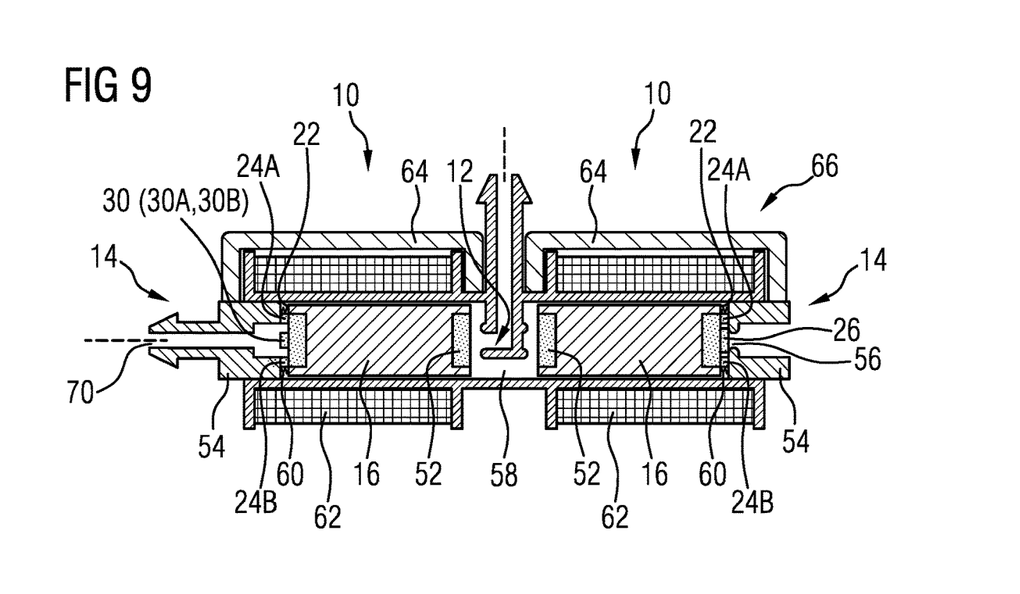
FIG. 9 shows a schematic view of the actuator arrangement from FIG. 8, wherein a filling state is shown.

Reference is now made to FIGS. 8 and 9, which show the use of the hitherto described actuator arrangement in a further electromagnetically actuatable valve. In the specific example of FIGS. 8 and 9, two actuator arrangements 10 are used in a 3/3 NO valve 66. The term "3/3 NO valve" means that this valve has three ports and three positions and is open (NO=normally open) in an inactive (electrically deenergized) state.

In the specific example of FIGS. 8 and 9, the 3/3 NO valve 66 is part of a pneumatic adjusting device 68. This pneumatic adjusting device 68 is used to adjust the seat contact face 44 of the vehicle seat 45 by means of the fluid-fillable fluid bladder 46, by virtue of the fluid bladder 46 being filled or emptied. Furthermore, by means of the 3/3 NO valve 66, the pressure in the fluid bladder 46 can be held. FIG. 8 shows the 3/3 NO valve 68 in an electrically deenergized state, in which the fluid bladder 46 is being ventilated or emptied. FIG. 9 shows the 3/3 NO valve 68 in an inactive state, in which the fluid bladder 46 is being filled. The pressure-holding state is not shown, but will be explained.

The 3/3 NO valve 66 is made up substantially of two 2/2 valves, each of which has an actuator arrangement 10 with a movable solenoid armature 16 and has an electromagnetic core 54, a magnet coil 62 and a yoke 64. Here, the right-hand 2/2 NO valve is substantially structurally identical to the 3/2 NO valve that has been described in conjunction with FIGS. 6 and 7. That is to say, the right-hand 2/2 NO valve has the solenoid armature 16 with the damping elements 24A and 24B provided on the second armature end surface 22 and with the stop element 26 configured as a sealing element. Only the first housing wall 12 of the right-hand 2/2 NO valve does not have a fluid opening 48 to the fluid source 50 as described in conjunction with FIG. 6, but rather has only the non-controllable fluid opening 58. However, the non-controllable fluid opening 58 of the right-hand 2/2 NO valve is connected to the pressure chamber of the left-hand 2/2 NC valve. The left-hand 2/2 NC valve in turn has an actuator arrangement 10, wherein the first housing wall 12 is now fluidically connected via a corresponding fluid connection to the fluid source 50, and the second housing wall 14 is fluidically connected via a fluid opening 70 to the fluid bladder 46.

By contrast to the right-hand solenoid armature 16, the left-hand solenoid armature 16 furthermore has, on its second armature end surface 22, a stop element 30 in addition to the damping elements 24A and 24B, which stop element is configured as mutually spaced-apart stop elements 30A, 30B, as described in conjunction with FIGS. 4 and 5.

Both the right-hand solenoid armature 16 and the left-hand solenoid armature 16 are movable between a first position and a second position. In FIG. 8, the right-hand solenoid armature 16 is shown in first position and the left-hand solenoid armature 16 is likewise shown in the first position.

In the first position of the right-hand solenoid armature 16, the damping elements 24A and 24B make contact with the second housing wall 14 of the right-hand actuator arrangement 10. Likewise, in the first position of the left-hand solenoid armature 16, the damping elements 24A and 24B make contact with the second housing wall 14 of the left-hand armature arrangement 10. Furthermore, the damping elements 24A, 24B and the stop elements 30A, 30B of the left-hand actuator arrangement 10 are arranged spaced apart from one another such that a radial flow on the second armature end surface 22 of the left-hand solenoid armature 16 is possible. This has the result that a fluid situated in the fluid bladder 46 can flow through the fluid opening 70 and radially over the second armature end surface 22 of the left-hand solenoid armature 16. From there, the fluid can flow onward through the non-controllable fluid opening 58 into the valve chamber of the right-hand 2/2 NO valve and, from there, through the fluid opening 56 into the surroundings. In other words, the fluid bladder 46 can be emptied or ventilated by means of the 3/3 NO valve 66 shown in FIG. 8.

If the 3/3 NO valve 66 is now correspondingly electrically energized, then the right-hand solenoid armature 16 moves from the first position into the second position counter to the restoring force of the right-hand restoring element 60. In the second position, the right-hand stop element 26, configured as a sealing element, makes contact with a sealing seat of the fluid opening 56, such that a fluidic connection to the surroundings is shut off. Furthermore, in the case of corresponding electrical energization of the 3/3 NO valve 66, the left-hand solenoid armature 16 is moved from the first position into the second position counter to the restoring force of the left-hand restoring element 60 from the first position into the second position. In the second position, not only the damping elements 24A, 24B but also the stop elements 30A, 30B make contact with the second housing wall 14, configured as an electromagnetic core 54, of the left-hand actuator arrangement 10. However, the damping elements 24A, 24B and the stop element 30A, 30B are arranged spaced apart from one another such that a fluid flow through the fluid opening 70 is possible also in the second position of the left-hand solenoid armature 16. Since it is furthermore the case in the second position of the left-hand solenoid armature 16 that contact is no longer made with the first housing wall 12, fluid can flow from the fluid source 50 via the fluid opening 70 into the fluid bladder 46 (but not via the fluid opening 56 into the surroundings). In other words, in the position of the 3/3 NO valve 66 shown in FIG. 9, the fluid bladder 46 can be filled with fluid.

If it is now sought—as has been mentioned above—for the pressure in the fluid bladder 46 to be held, then it is merely necessary for the 3/3 NO valve 66 to be electrically energized such that the left-hand solenoid armature 16 is moved from the second position back into the first position. In this way, a fluidic connection to the fluid source 50 is shut off by means of the sealing element 52 of the left-hand solenoid armature 16. At the same time, the right-hand solenoid armature 16 remains in the second position, in which a fluidic connection to the surroundings is also shut off.

The actuator arrangements 10 shown in FIGS. 8 and 9 thus, in the 3/3 NO valve 66, allow filling and emptying of the fluid bladder 46 and holding of a pressure of the fluid bladder 46. Owing to the respectively provided damping elements 24A, 24B and the absence of free-flight phases of the solenoid armature 16, the switching noises of the 3/3 NO valve 66 are however considerably reduced.

Figure 10:
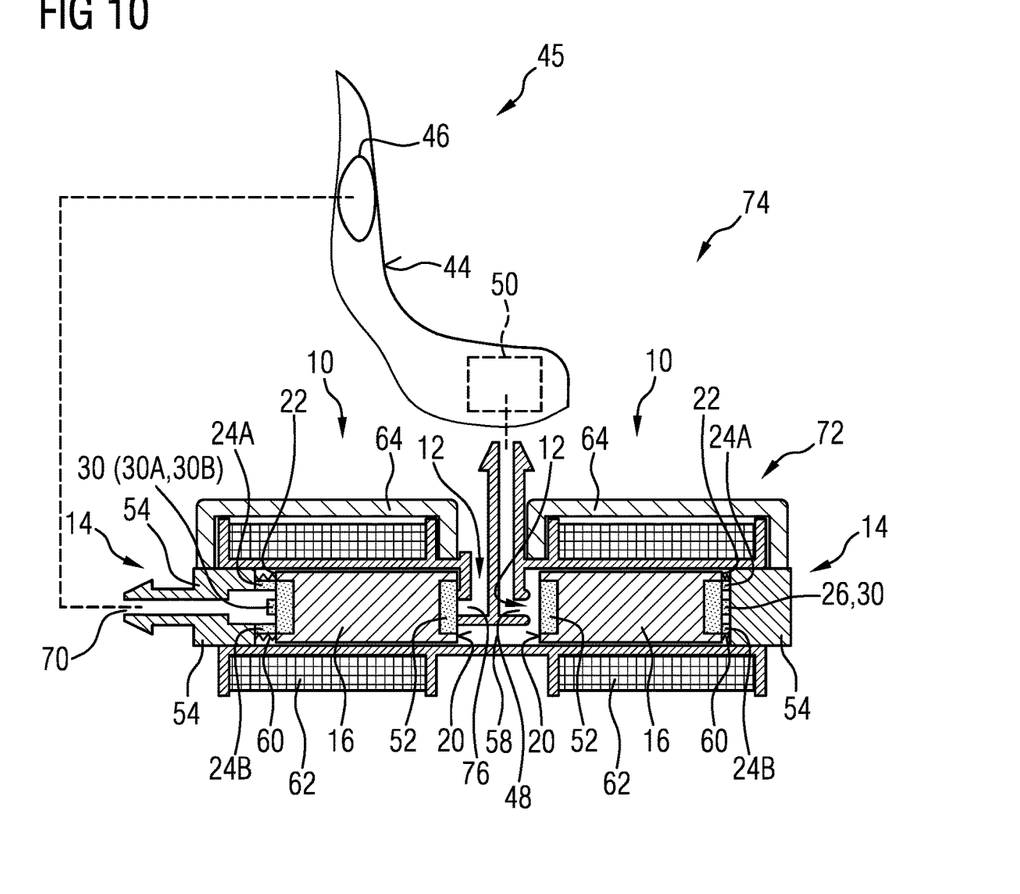
FIG. 10 shows a schematic view of an embodiment of an actuator arrangement according to the invention in a 3/3 NC valve for a pneumatic adjusting device of a vehicle seat, wherein a filling state is shown.
Figure 11:
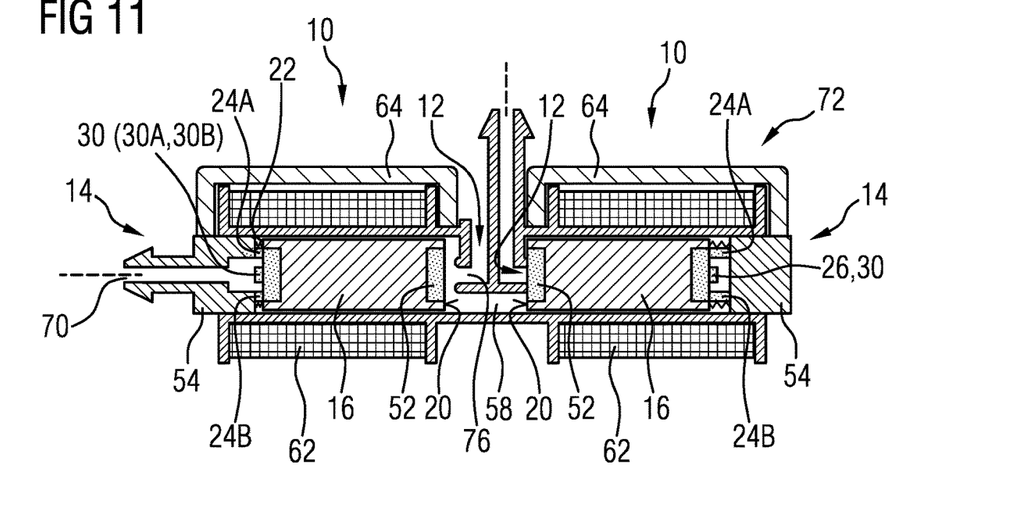
FIG. 11 shows a schematic view of the actuator arrangement from FIG. 10, wherein a ventilation state is shown.

Reference is finally made to FIGS. 10 and 11, which show the use of the hitherto described actuator arrangement in a further electromagnetically actuatable valve. In the specific example of FIGS. 10 and 11, two actuator arrangements 10 are used in a 3/3 NC valve 72. The term "3/3 NC valve" means that this valve has three ports and three positions and is closed (NC=normally closed) in an inactive (electrically deenergized) state.

In the specific example of FIGS. 10 and 11, the 3/3 NC valve 72 is part of a pneumatic adjusting device 74. This pneumatic adjusting device 74 is used to adjust the seat contact face 44 of the vehicle seat 45 by means of the fluid-fillable fluid bladder 46, by virtue of the fluid bladder 46 being filled or emptied. Furthermore, by means of the 3/3 NC valve 74, the pressure in the fluid bladder 46 can be held. FIG. 10 shows the 3/3 NC valve 72 in an electrically deenergized state, in which the fluid bladder 46 is being filled. FIG. 11 shows the 3/3 NC valve 72 in an active state, in which the fluid bladder 46 is being ventilated or emptied. The pressure-holding state is not shown, but will be explained.

The 3/3 NC valve 72 is made up substantially of two 2/2 NC valves, each of which has an actuator arrangement 10 with a movable solenoid armature 16 and has an electromagnetic core 54, a magnet coil 62 and a yoke 64. Here, the right-hand 2/2 NC valve is similar to the left-hand 2/2 NC valve that has been described in conjunction with FIGS. 8 and 9. However, the first housing wall 12 of the left-hand actuator arrangement 10 has a fluid opening 76 that is connected not to the fluid source 50, as in FIGS. 8 and 9, but to the surroundings. The first armature end surface 20 has a sealing element 52 that closes the fluid opening 76 in fluid-tight fashion in the first position of the left-hand solenoid armature 16. The second armature end surface 22 has damping elements 24A, 24B and stop elements 30A, 30B, which allow a radial flow over the second armature end surface 22 both in the first and in the second position of the left-hand solenoid armature 16. Furthermore (as in the refinement of FIGS. 8 and 9), the second housing wall 14 of the left-hand actuator arrangement 10 is configured as an electromagnetic core 54 having a fluid opening 70 extending through it. The fluid opening 70 again produces the fluidic connection to the fluid bladder 46. Also, the first housing wall 12 of the left-hand actuator arrangement 10 has the non-controllable fluid opening 58, whereby a fluidic connection between the valve chamber of the left-hand 2/2 NC valve and the valve chamber of the right-hand 2/2 NC valve is ensured.

In the case of the right-hand actuator arrangement 10 of the right-hand 2/2 NC valve, the first housing wall 12 is again configured with a fluid opening 48, similarly to the refinement of FIGS. 6 and 7. The first armature end surface 20 of the right-hand solenoid armature 16 is also configured with a sealing element 52 in order to close the fluid opening 48 in fluid-tight fashion. The second housing wall 14 is configured as an electromagnetic core 54. However, the second housing wall 14 or the core 54 does not have a fluid opening. However, the second armature end surface 22 of the right-hand solenoid armature 16 again has the damping elements 24A, 24B and either a stop element 26 with the refinement of FIG. 3 or a stop element 30 with the refinement of FIGS. 4 and 5.

As can be seen in FIG. 10, the right-hand solenoid armature 16 is situated in the second position, in which the damping elements 24A, 24B and the stop element (26 or 30, depending on the refinement) make contact with the second housing wall 14. In this way, the sealing element 52 of the first armature end surface 20 has been moved away from the first housing wall 12 of the right-hand actuator arrangement 10. Fluid from the fluid source 50 can thus flow in via the fluid opening 48. From there, fluid can flow onward through the non-controllable fluid opening 58 into the valve chamber of the left-hand 2/2 NC valve. However, in the embodiment shown in FIG. 10, the left-hand solenoid armature 16 is situated in the first position, such that the sealing element 52 of the left-hand solenoid armature 16 closes the fluid opening 76 and a fluidic connection to the surroundings is shut off. However, fluid can flow radially over the second armature end surface 22 of the left-hand solenoid armature 16 and from there via the fluid opening 70 into the fluid bladder 46. In other words, the fluid bladder 46 can be filled via the 3/3 NC valve 72 in the position shown in FIG. 10.

If it is now sought for the fluid bladder 46 to be ventilated, then the 3/3 NC valve 72 must be electrically energized such that the left-hand solenoid armature 16 moves from the first position into the second position and the right-hand solenoid armature 16 moves from the second position into the first position. If the right-hand solenoid armature 16 is situated in the first position, an inflow of fluid from the fluid source 50 is prevented. If the left-hand solenoid armature 16 is furthermore situated in the second position, the fluid opening 76 is opened up because the sealing element 52 of the left-hand solenoid armature 16 no longer closes the fluid opening 76. Since the damping elements 24A, 24B and the stop element 30A, 30B are furthermore arranged spaced apart from one another such that a fluid flow through the fluid opening 70 is possible also in the second position of the left-hand solenoid armature 16, fluid can flow from the fluid bladder 46 through the fluid opening 76 into the surroundings. In other words, in the position of the 3/3 NC valve 72 shown in FIG. 11, the fluid bladder 46 can be emptied or ventilated.

If it is now also sought—as has been mentioned above—for the pressure in the fluid bladder 46 to be held, then it is merely necessary for the 3/3 NC valve 72 to be electrically energized, or electrically deenergized, such that the left-hand solenoid armature 16 is moved from the second position back into the first position. In this way, a fluidic connection to the surroundings is shut off by means of the sealing element 52 of the left-hand solenoid armature 16. At the same time, the right-hand solenoid armature 16 must remain in the first position in order that a fluidic connection to the fluid source 50 is shut off.

The actuator arrangements 10 shown in FIGS. 10 and 11 thus, in the 3/3 NC valve 72, allow filling and emptying of the fluid bladder 46 and holding of a pressure of the fluid bladder 46. Owing to the respectively provided damping elements 24A, 24B and the absence of free-flight phases of the solenoid armature 16, the switching noises of the 3/3 NC valve 72 are however considerably reduced.

Further arrangements of the actuator arrangements 10 in corresponding refinements are conceivable in order to realize further valves that are suitable for the respective application.

The invention claimed is:

1. An actuator arrangement for an electromagnetically actuatable valve, comprising:
    a housing comprising a first housing wall and a second housing wall situated opposite the first housing wall,
    a solenoid armature arranged in the housing between the first housing wall and the second housing wall and movable between the first housing wall and the second housing wall along an axis, wherein the solenoid armature has a first axial armature end surface, which faces toward the first housing wall, and a second axial armature end surface, which faces toward the second housing wall, and the solenoid armature is movable between a first position, in which the first axial armature end surface makes contact with the first housing wall, and a second position, in which the first axial armature end surface has been moved away from the first housing wall,
    at least one damping element which is arranged on the second axial armature end surface and which extends from the second axial armature end surface in a direction of the second housing wall and which comprises an elastomer material with progressive spring characteristic, wherein the at least one damping element makes contact with the second housing wall both in the first position and in the second position of the solenoid armature, and at least one stop element which is arranged on the second axial armature end surface and which extends from the second axial armature end surface in the direction of the second housing wall and which comprises an elastomer material and which, in the first position of the solenoid armature, has been moved away from the second housing wall and, in the second position of the solenoid armature, makes contact with the second housing wall, wherein the at least one damping element has a first extent dimension in an axial direction of the solenoid armature, has a second extent dimension in a circumferential direction of the solenoid armature, and has a third extent dimension in a radial direction of the solenoid armature, and a ratio of the first extent dimension to the second extent dimension lies in a range between approximately 1 and approximately 2, and a ratio of the first extent dimension to the third extent dimension lies in a range between approximately 1 and approximately 2.

2. The actuator arrangement as claimed in claim 1, wherein the at least one damping element and the at least one stop element are formed from same elastomer material.

3. The actuator arrangement as claimed in claim 1, wherein, in the first position of the solenoid armature, an axial extent of the at least one damping element is greater than an axial extent of the at least one stop element.

4. The actuator arrangement as claimed in claim 3, wherein a difference between the axial extent of the at least one stop element and the axial extent of the at least one damping element is not substantially larger than a range of a stroke of the solenoid armature.

5. The actuator arrangement as claimed in claim 1, wherein the second housing wall has a fluid opening which extends through the second housing wall, and the at least one stop element, in the second position of the solenoid armature, makes fluid-tight contact with a sealing seat of the fluid opening.

6. The actuator arrangement as claimed in claim 1, wherein the second housing wall has a fluid opening which extends through the second housing wall, and the at least one damping element is arranged spaced apart from the at least one stop element such that, both in the first position of the solenoid armature and in the second position of the solenoid armature, a fluid channel for a fluid flowing radially at the second axial armature end surface and through the fluid opening is formed between the at least one damping element and the at least one stop element.

7. The actuator arrangement as claimed in claim 1, wherein the at least one damping element has an axial damping element end surface, and a size of the at least one damping element end surface is in a range between approximately 5% and approximately 50% of a size of the second axial armature end surface.

8. The actuator arrangement as claimed in claim 1, wherein, in the first position of the solenoid armature, an extent of the at least one stop element in a circumferential direction of the solenoid armature is at least twice as great as an extent of the at least one damping element in the circumferential direction of the solenoid armature.

9. The actuator arrangement as claimed in claim 1, furthermore having:
at least one further damping element which is arranged on the second axial armature end surface and which extends from the second axial armature end surface in the direction of the second housing wall and which makes contact with the second housing wall both in the first position and in the second position of the solenoid armature,
wherein the at least one further damping element is arranged spaced apart from the at least one damping element such that, at least in the first position of the solenoid armature, a fluid channel for a fluid flowing radially at the second axial armature end surface is formed between the at least one damping element and the at least one further damping element.

10. The actuator arrangement as claimed in claim 9, wherein the at least one damping element and the at least one further damping element have an equal radial spacing to the axis.

11. The actuator arrangement as claimed in claim 1, wherein the second housing wall is configured at least partially as an electromagnetic core.

12. The actuator arrangement as claimed in claim 1, wherein the first housing wall has a fluid opening that extends through the first housing wall, and the actuator arrangement further comprises:
a sealing element which is arranged on the first axial armature end surface and which extends from the first axial armature end surface in a direction of the first housing wall and which, in the first position of the solenoid armature, makes fluid-tight contact with a sealing seat, arranged at the first housing wall, of the fluid opening.

13. The actuator arrangement as claimed in claim 12, wherein the sealing element, the at least one damping element and the at least one stop element are formed from same elastomer material.

14. The actuator arrangement as claimed in claim 1, wherein the actuator arrangement further comprises a restoring element which is configured to preload the solenoid armature into the first position in absence of actuation.

15. The actuator arrangement as claimed in claim 1, wherein the at least one damping element has an axial damping element end surface, and a size of the at least one damping element end surface is in a range between approximately 10% and approximately 20% of a size of the second axial armature end surface.

* * * * *